No. 738,881. PATENTED SEPT. 15, 1903.
J. M. BRYANT.
THILL COUPLING.
APPLICATION FILED MAY 15, 1902. RENEWED FEB. 21, 1903.
NO MODEL.
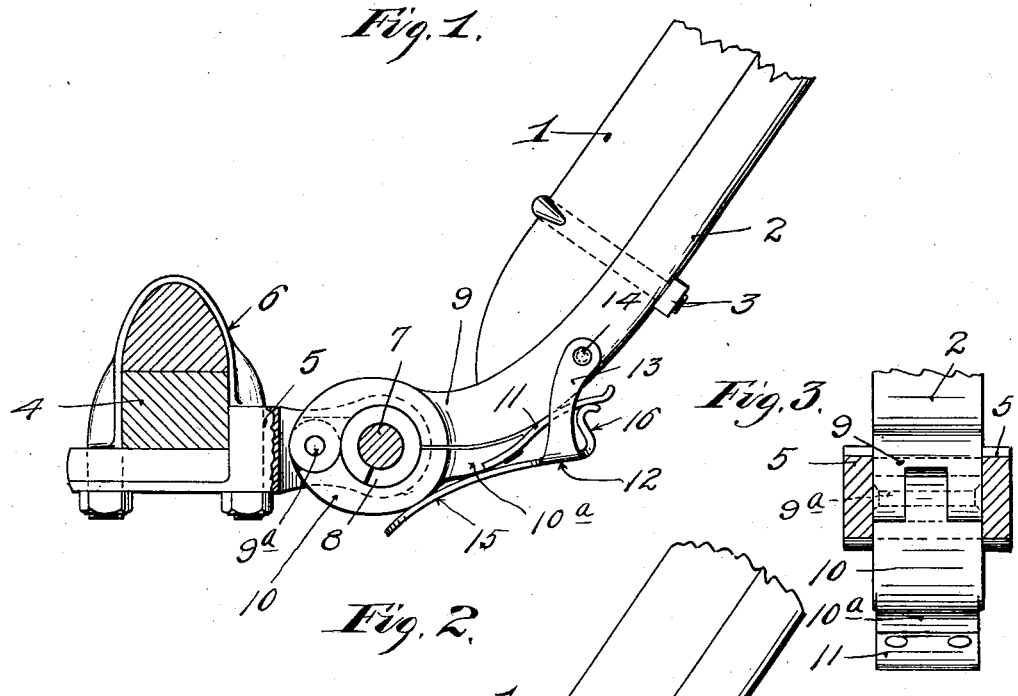
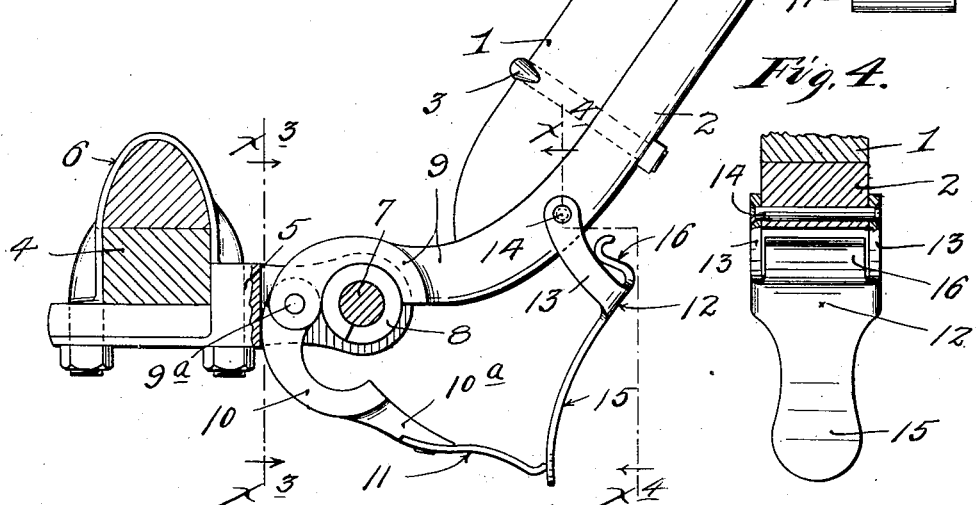
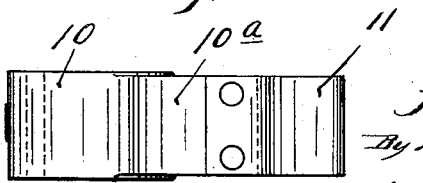
Witnesses.
H. D. Kilgore
A. H. Opsahl.
Inventor:
John M. Bryant.
By his Attorneys.
Williamson Merchant No. 738,881.

Patented September 15, 1903.

UNITED STATES PATENT OFFICE.

JOHN M. BRYANT, OF MINNEAPOLIS, MINNESOTA.

THILL-COUPLING.

SPECIFICATION forming part of Letters Patent No. 738,881, dated September 15, 1903.

Application filed May 15, 1902. Renewed February 21, 1903. Serial No. 144,624. (No model.)

*To all whom it may concern:*

Be it known that I, JOHN M. BRYANT, a citizen of the United States, residing at Minneapolis, in the county of Hennepin and State of Minnesota, have invented certain new and useful Improvements in Thill-Couplings; and I do hereby declare the following to be a full, clear, and exact description of the invention, such as will enable others skilled in the art to which it appertains to make and use the same.

My present invention has for its object to provide certain improvements in the construction of couplings used in connection with thills, poles, &c.; and to such end it consists of the novel devices and combinations of devices hereinafter described, and defined in the claims.

The invention is illustrated in the accompanying drawings, wherein like characters indicate like parts throughout the several views.

Figure 1 is a view, principally in side elevation, but with some parts sectioned, showing a portion of a pair of thills and the front axle of a vehicle, the said parts being connected by one of my improved couplings. Fig. 2 is a similar view to Fig. 1, but showing the pivoted jaw of the coupling swung into an open position. Fig. 3 is a transverse section on the line $x^3$ $x^3$ of Fig. 2. Fig. 4 is a transverse section on the irregular line $x^4$ $x^4$ of Fig. 2, and Fig. 5 is a bottom plan view of the pivoted jaw of the coupling.

The numeral 1 indicates a portion of the thills to which one of the metal straps 2 is rigidly secured in the ordinary or any suitable way—as, for instance, by a nutted bolt 3.

The numeral 4 indicates the front axle of a vehicle, to which axle a coupling-bracket 5 is shown as secured by means of a yoke-clip 6. A coupling-bolt 7 is passed through the ears of the coupling-bracket 5, and, as shown, a split bushing 8, of leather or rubber, is placed directly on said bolt 7.

A pair of coupling-jaws 9 and 10 are pivotally connected at $9^a$—to wit, at their inner ends. The jaw 9 is preferably formed integral with the strap 2, and both of said jaws are provided with semicylindrical seats which when the bushing is provided closely fit said bushing and when the bushing is not provided would be made to closely fit the bolt 7. At its outer or forward end the jaw 10 is provided with a lug or projection $10^a$, to which is secured a spring tail extension 11, preferably of tempered steel. A pivoted spring lock-lever 12 is provided with prongs or long ears 13, which are pivoted by a rivet or bolt 14 to the extended end of the jaw 9. Said lock-lever 12 is provided with a depending handpiece 15 and with a spring presser-foot or curved end extension 16. The spring presser-foot 16 is engageable with the spring tail or extension 11 of the pivoted jaw 10 to lock said jaw in its operative position, as indicated in Fig. 1. As is evident, in the position of the parts shown in Fig. 1 the line of strain exerted by the spring tail 11 on the spring-foot 16 is radially outward from the axis of the pivot 14, and this line of strain being forward of the handpiece 15 the said handpiece is tightly pressed against the pivoted jaw 10, while the spring extension or tail 11 is tightly pressed against the jaw 9. Of course the spring extension 11 might be so bent that it would not strike the said jaw 9; but I prefer to bend the same as illustrated, so that when the parts are locked, as shown in Fig. 1, it will react with greater force on the spring-foot 16, and thereby press the hand-lever 15 more tightly against the pivoted jaw 10, which pressure of course assists in holding the said pivoted jaw in an operative position. To release the pivoted jaw 10, the lock-lever 12 is thrown forward into a position as far or farther forward than that illustrated in Fig. 2. As is of course evident, to lock the said pivoted jaw it is first necessary to force the same to its closed position and then to force the lock-lever 12 rearward from the position indicated in Fig. 2 into the position indicated in Fig. 1.

It will of course be understood that the device above described is capable of considerable modification within the scope of my invention as herein set forth and claimed. For instance the best results are obtained by making both of the parts 11 and 16 of spring material; but fairly good results may be obtained by making either of the said parts rigid and the other resilient or of spring material.

What I claim, and desire to secure by Letters Patent of the United States, is as follows:

1. A coupling for thills, poles, &c., comprising a pair of pivotally-connected jaws, the pivotally-movable member of which has a projecting tailpiece or free end, and a lock-lever directly pivoted to the relatively fixed jaw and provided with a presser-foot or projection engageable with the tail of the movable jaw and movable from one side to the other of a dead-center to lock and release the said movable jaw, substantially as described.

2. A coupling for thills, poles, &c., comprising a pair of pivotally-connected jaws 9 and 10, the latter having a projecting tail or extension 11, and the lock-lever having laterally-spaced ears directly pivoted to said jaw 9 and provided with a presser-foot engageable with said spring-tailpiece 11 and operating thereon, substantially as described.

3. A coupling for thills, poles, &c., comprising a pair of pivotally-connected jaws 9 and 10, the latter having a projecting tailpiece at its free end, of the lock-lever 12 with handpiece 15, spring presser-foot 16 and laterally-spaced ears 13, which ears are pivoted to said jaw 9 at 14, and which spring presser-foot 16 operates on the tailpiece of said jaw 10, substantially as described.

4. A coupling for thills, poles, &c., comprising the pivotally-connected jaws 9 and 10, the latter having the spring tail or extension 11 at its free end, and the lock-lever 12 with handpiece 15, spring presser-foot 16 and laterally-spaced ears 13, which ears are pivoted to said jaw 9, at 14, and which spring presser-foot 16 operates on said spring tail or extension 11, to lock said jaw 10, substantially as described.

5. A coupling for thills, poles, &c., comprising a pair of pivotally-connected jaws, the relatively movable member of which is provided with a spring tail or extension at its free end and a lock lever or device reacting on the relatively fixed jaw and on said spring tail or extension, to hold the said jaws in operative position, substantially as described.

In testimony whereof I affix my signature in presence of two witnesses.

JOHN M. BRYANT.

Witnesses:
ELIZABETH H. KELIHER,
F. D. MERCHANT.